United States Patent
Coblitz

[11] 4,007,979
[45] Feb. 15, 1977

[54] REFLECTION ELIMINATION SYSTEM

[75] Inventor: David B. Coblitz, Hazelwood, Mo.

[73] Assignee: McDonnell Douglas Corporation, St. Louis, Mo.

[22] Filed: Apr. 18, 1975

[21] Appl. No.: 569,480

[52] U.S. Cl. .............................. 350/156; 350/157
[51] Int. Cl.[2] ...................................... G02B 27/10
[58] Field of Search ............ 350/156, 157, 158, 159

[56] References Cited
UNITED STATES PATENTS

| | | | |
|---|---|---|---|
| 3,062,087 | 11/1962 | Zandman et al. | 350/157 |
| 3,177,761 | 4/1965 | Redner | 350/157 |
| 3,707,321 | 12/1972 | Jaecklin et al. | 350/157 |

Primary Examiner—Edward S. Bauer
Assistant Examiner—Richard A. Rusenberger
Attorney, Agent, or Firm—Lionel L. Lucchesi

[57] ABSTRACT

A device which eliminates unwanted light rays and permits passage of desired light rays. For the purposes of this specification, the desired light rays are those which originate on a first side of a material capable of effecting light passage, and which pass through the material to a second side. Undesirable light rays are those originating on the second side of the material, which pass through the material to the second side of the material. The material, in the embodiment illustrated, is a beam splitter intended to present a desired scene to an observer. The preferred embodiment includes a linear polarizer and a quarter wave retarder which impart an elliptical polarization to the undesired light rays. The polarizer and the retarder are arranged with respect to one another and to the beam splitter so that undesired light passing through the polarizer, retarder, and the beam splitter, and which is reflected back through the beam splitter to the polarizer will return, after reflection, with the same ellipticity but with orthogonal orientation. A method for determining the ratio components of light polarization when light is transmitted through a material, reflected and returned through the same material.

15 Claims, 9 Drawing Figures

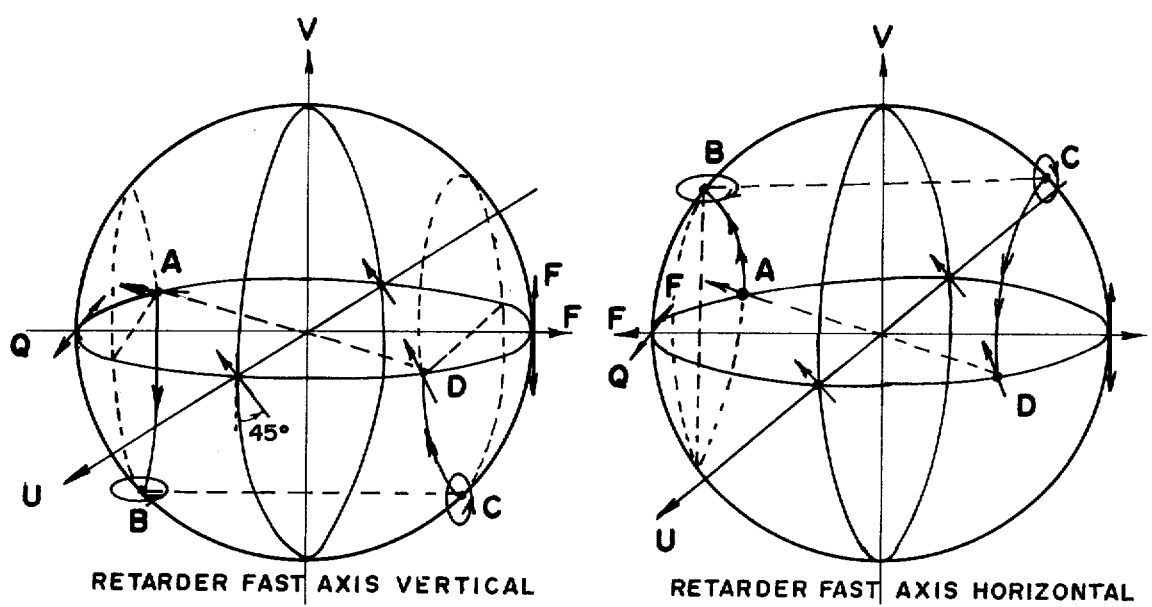
FIG. 4. RETARDER FAST AXIS VERTICAL
FIG. 5. RETARDER FAST AXIS HORIZONTAL
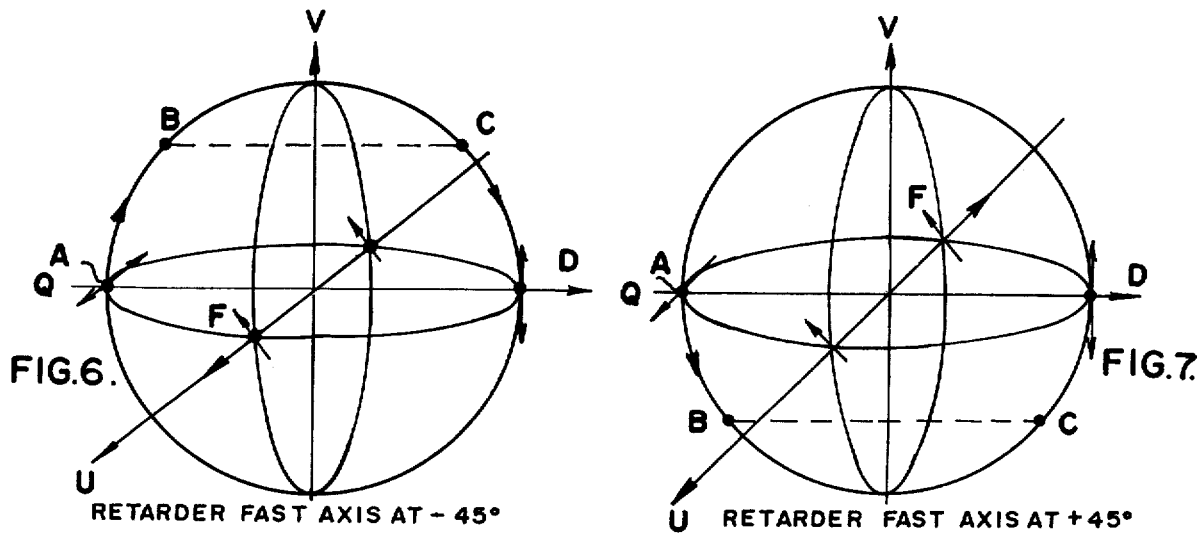
FIG. 6. RETARDER FAST AXIS AT −45°
FIG. 7. RETARDER FAST AXIS AT +45°
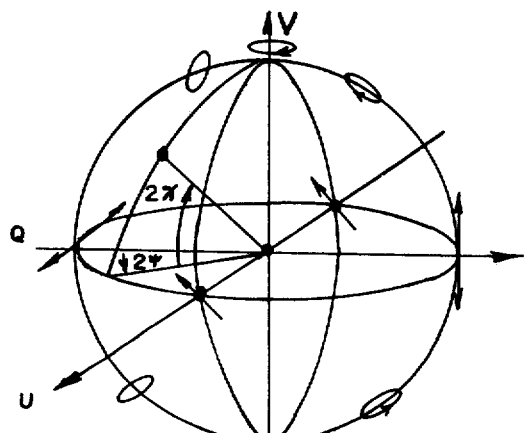
FIG. 8.
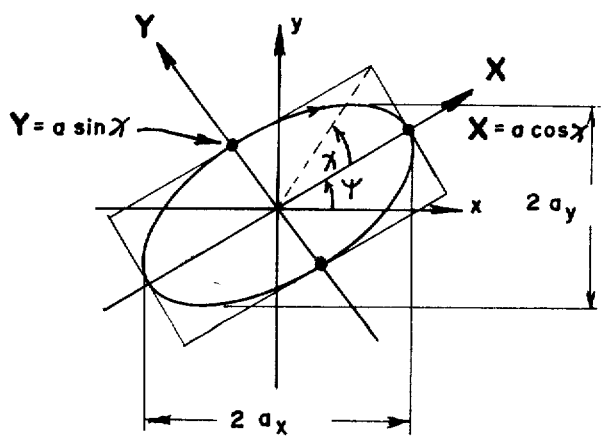
FIG. 9.

REFLECTION ELIMINATION SYSTEM

BACKGROUND OF THE INVENTION

This invention relates to polarizing systems, and in particular, to a device utilizing a polarizer for eliminating undesirable radiation while permitting passage of desired radiation. While the invention is described in particular detail with respect to light ray projection in an aircraft flight simulator, those skilled in the art will recognize the wider adaptability of the invention disclosed hereinafter.

It is conventional to provide aircraft flight simulators which are detailed mock-ups of a particular aircraft for which training is being provided. That is to say, the flight deck or cockpit of a particular aircraft is recreated so that flight crews can fly the simulator prior to flying the actual aircraft. Generally, sound, motion, and visual sensory perception are provided during such simulated flight. Modern simulators provide physical sensations that closely approximate those experienced in actual flight. One of the more common simulation experiences for which training is provided is landing and take-off of the aircraft. Training in night and instrument landing approaches in particular are practiced, these being among the more difficult aircraft flight procedures. Commonly, the pilot of the simulator is provided with a CRT (cathode ray tube) display which corresponds to the window view of the pilot. That is, the view normally observable by the pilot of an aircraft is replaced, in the simulator, by an electronically generated display that closely resembles an actual airfield. The display changes in response to any simulator aircrat position change. Flight crews thus are able to acquaint themselves with the performance characteristics of a particular aircraft before ever actually flying the aircraft.

One particular simulator window design finding commercial acceptance has a CRT display device arranged so that the image electronically displayed on the CRT is projected to a beam splitter where it is reflected toward a mirror. The desired image is reflected by the mirror back through the beam splitter so that an observer in the simulator sees the mirror reflection. The particular system just described is advantageous because it affords a highly effective yet relatively low cost optical system for presentation of a desired scene.

As indicated, one of the training situations for which simulation training is provided involves night approaches to a landing field. In these situations, the initial view observed by the pilot may consist merely of light points in the field of view. As will be appreciated by those skilled in the art, the flight deck or cockpit of modern aircraft contains a multiplicity of illuminated dials. Prior to my invention, light waves generated by the illuminated dials passed through the simulator window and the beam splitter to the mirror, where they were reflected back through the beam splitter to the observer. For the purposes of this specification, the term "beam splitter" is intended to be an example of various materials that partially polarize radiation passage through the material. The reflected light confuses the window scene, and is both annoying and distracting to aircraft flight personnel in the simulator.

Circular polarizers are known in the art and often are used to eliminate reflected light. For example, it is known that a plane polarizer and a quarter wave retarder can be arranged to eliminate light originating on a first side of the polarizer so that light passing through the polarizer and retarder to a reflective surface from where it attempts to return back through the retarder and polarizer will be blocked by the polarizer. Such a system is diagrammatically illustrated in the drawings at FIG. 1, and labeled as prior art.

Circular polarizers, however, are not acceptable in the particular application described above because the optical system of the simulator utilizes a dielectric beam splitter as an integral part of the system for image generation. Dielectric beam splitters in general, reflect S plane wave components more than P plane wave components so that upon return to the circular polarizer, the reflected light is not merely a diametrically opposed polarization of the original polarization provided by the circular polarizer. Consequently, the circular polarizer permits some reflected light back through it, into the field of view of an observer of the window. As will be understood by practioners in the art, P plane wave components, or P polarized light is light having its electric vector polarized parallel to the plane of incidence of the light, while S plane wave components, or S polarized light, is light having its electric vector polarized perpendicular to the plane of incidence. The plane of incidence is defined as the plane containing both the normal to the beam splitter, at the point of incidence, and the incoming ray of light.

My invention eliminates the prior art difficulty with reflected light by utilizing an elliptical polarizer arranged properly with respect to the beam splitter. That is to say, total extinction of the reflected light is achieved by imparting an elliptical polarization to the light beam such that, when the beam is transmitted through the beam splitter, which may be considered an example of a variety of partially polarizing materials, and returned through that material, the beam becomes polarized with the same ellipticity but with orthogonal orientation. As described in greater detail hereinafter, the invention resides in part in the ability to easily define the proper elliptical polarizer for any beam splitter and the ability to easily calculate the orientation of components of the elliptical polarizer in any of a variety of embodiments.

My invention also provides a method for measurement of the ratio of P and S plane transmittance of a material when light is passed through partially polarizing material and reflected back through the same material.

One of the objects of this invention is to provide a device for eliminating reflected radiation transmitted through a partially polarizing material to a mirror and returning through the material, while allowing passage of that radiation making only a single pass through the material.

Another object of this invention is to provide a low cost method for measuring the ratio of P and S polarization transmittance through a material.

Another object of this invention is to provide an economical structure for eliminating undesired light when the undersired light passes and is reflected back through a partially polarizing material.

Other objects of this invention will be apparent to those skilled in the art in light of the following description and accompanying drawings.

SUMMARY OF THE INVENTION

In accordance with this invention, generally stated, a device is provided which eliminates reflected light passing through the device and a material to a mirror, returning back through the material to the device, where the material has different transmittances for light polarized along S and P axes. In the preferred embodiment, the material is a beam splitter and the device includes a quarter wave retarder having a fast axis and a linear polarizer having a pass axis. The fast axis of the retarder is aligned in parallel relationship with either of the P or S axes of the beam splitter and the linear polarizer pass axis is positioned in a direction so as to yield total extinction of the unwanted reflection. A method is provided for determining the position of the pass axis location for the linear polarizer and for measuring the ratio of P and S polarization transmittance of the material.

BRIEF DESCRIPTION OF THE DRAWINGS

In the drawings,

FIG. 4 is a Poincaré sphere representation of the optical device shown in FIG. 2;

FIG. 5 is a Poincaré sphere representation of a second illustrative embodiment of the optical device shown in FIG. 2;

FIG. 6 is a Poincaré sphere representation of a third illustrative embodiment of the optical device shown in FIG. 2;

FIG. 7 is a Poincaré sphere representation of a fourth illustrative embodiment of the optical device shown in FIG. 2;

FIG. 8 is a diagramatic representation of a Poincaré sphere, useful for explanatory purposes; and FIG. 9 is a diagrammatic view illustrating the parameters for describing elliptically polarized light, shown for the right-handed case of a wave traveling toward an observer.

DESCRIPTION OF THE PREFERRED EMBODIMENT

Figure 2:
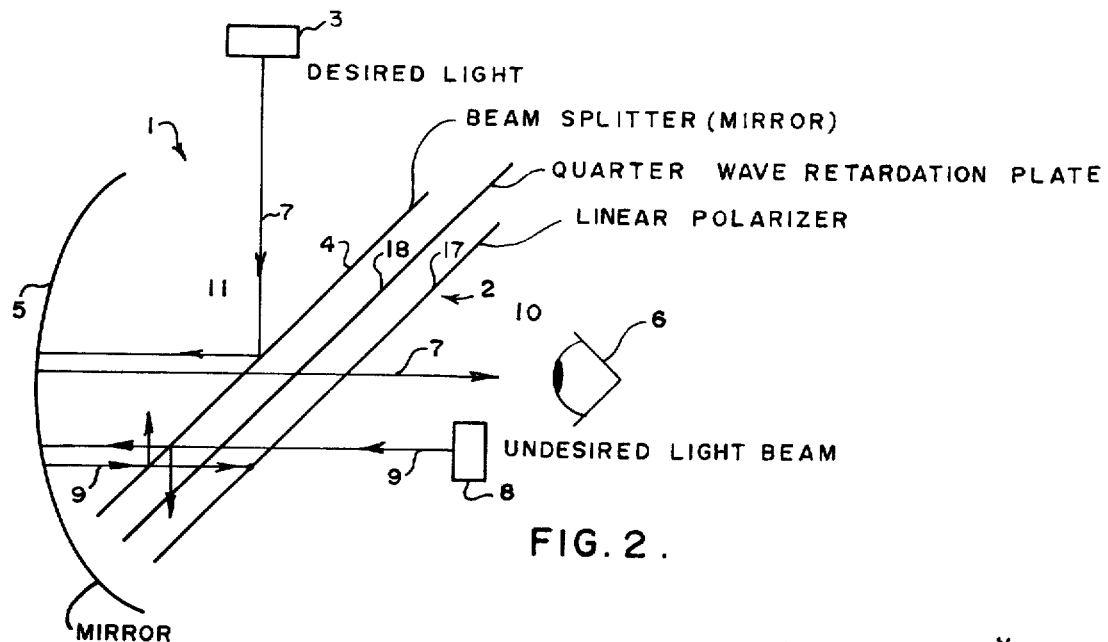
FIG. 2 is a diagrammatic illustration of a preferred embodiment of optical device of this invention.

Referring now the FIG. 2, reference numeral 1 indicates an optical system employing one illustrative embodiment of device 2 of this invention. The optical system 1 includes a source of desired light 3, a beam splitter 4, and a reflective mirror 5.

The light source 3, in the embodiment illustrated, is a conventional cathode ray tube (CRT) which is adapted to present a desired image to an observer 6. The desired image, diagrammatically illustrated by a desired light beam 7, is arranged so that it is reflected from a beam splitter 4 to the mirror 5, and back through the beam splitter 4 to the observer 6. The beam splitter 4 is positioned at an angle with respect to true horizontal and vertical in order to accomplish its image projection function. Mirror 5 is conventional and is not described in detail. While the mirror 5 is ilustratively shown as concave, other mirror design configurations are compatible with the broader aspects of this invention.

A source 8 of undesired light 9 is situated on an observer's side 10 of the beam splitter 4. The desired light source 3 is positioned on a side 11 of the beam splitter 4. Prior to my invention, a large portion of the light beam 9 from the undesired light source 8 would pass through the beam splitter 4, be reflected by the mirror 5, and return to the side 10 of the beam splitter 4.

The beam splitter 4 has a P axis 15 and an S axis 16. The P axis is known in the art and defined for purposes of this specification as the direction of the electric vector of an incoming light beam polarized parallel to the plane of incidence of the light beam upon the beam splitter 4. The S axis similarly is defined as the direction of the electric vector of an incoming light beam polarized perpendicularly to the plane of incidence. The plane of incidence is defined as that plane containing both the normal to the beam splitter 4, and the incoming light ray. It is well known that light tends to have its polarization properties altered upon oblique passage through a dielectric, of which the beam splitter 4 is exemplary. This is due to the unequal reflection suffered by different incident polarizations as they traverse the dielectric.

Figure 1:
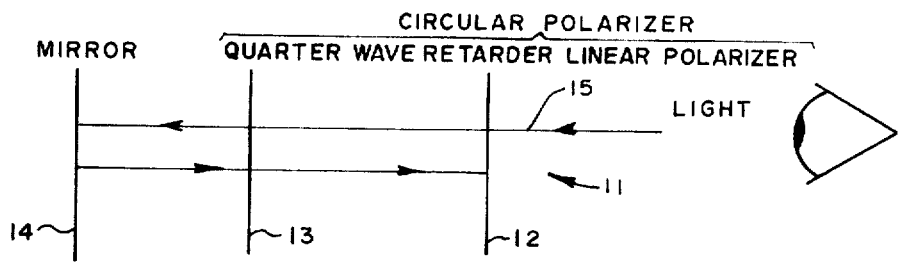
FIG. 1 is a diagrammatic illustration of a prior art optical system.

As indicated above, it also is known that a linear polarizer and a quarter wave retarder may be positioned with respect to one another to form a circular polarizer so that reflected light returning to the polarizer will be eliminated. A circular polarizer essentially is a linear polarizer and a quarter wave retarder mutually oriented at 45° or some odd multiple thereof. Such a prior art system 11 is shown in FIG. 1. The system 11 includes a linear polarizer 12 having a pass axis, a retarder 13 having a fast axis and a slow axis, and a mirror 14. An undesired light beam 15 passing through the linear polarizer 12 and the retarder 13 is reflected by the mirror 14 and returns through the retarder 13 to the polarizer 12, where it is absorbed or reflected. Retarders in general, and the retarder 13 in particular, have a different refractive index for linear polarization components along the retarder's fast and slow axes. Hence, the polarization components, upon passage through the retarder, have their phase relationships altered by an amount corresponding to the different optical path lengths resultant from the two different indices. Circular polarization is composed of two orthogonal linear polarizations of equal magnitude which are out of phase by 90°, i.e. one quarter wave length.

However, because of the nature of the beam splitter 4, use of a circular polarizer in the described embodiment of the invention does not prevent the undesired light beam 9 from returning to the side 10 of a beam splitter 4. Transmittance of radiation through the beam splitter 4 reduces the magnitude of one polarization component (S) with respect to the other polarization component (P), thus changing circular polarizations to elliptical polarization. Consequently, radiation emerging on the side 10 of the beam splitter 4 cannot possibly be a diametrically opposed polarization of the original polarization provided by a circular polarizer.

Elliptical polarizers also are known in the art. However, prior to my invention there was, to my knowledge, no reason to suspect that an elliptical polarizer would be any more successful in the environment of the invention than were circular polarizers. The invention described herein resides in part in perceiving the problem involved in a situation where undesired light originates on the side 10 of the beam splitter 4, and desired light originates on the side 11 of the beam splitter 4, both of which are reflected by the mirror 5 back through the beam splitter 4 to the side 10, and realizing that the natural tendency of beam splitter 4 to affect passage of light through it differently for different polarizations could be used advantageously by proper choice in the initial polarization of the undesirable light beam 7.

Figure 3:
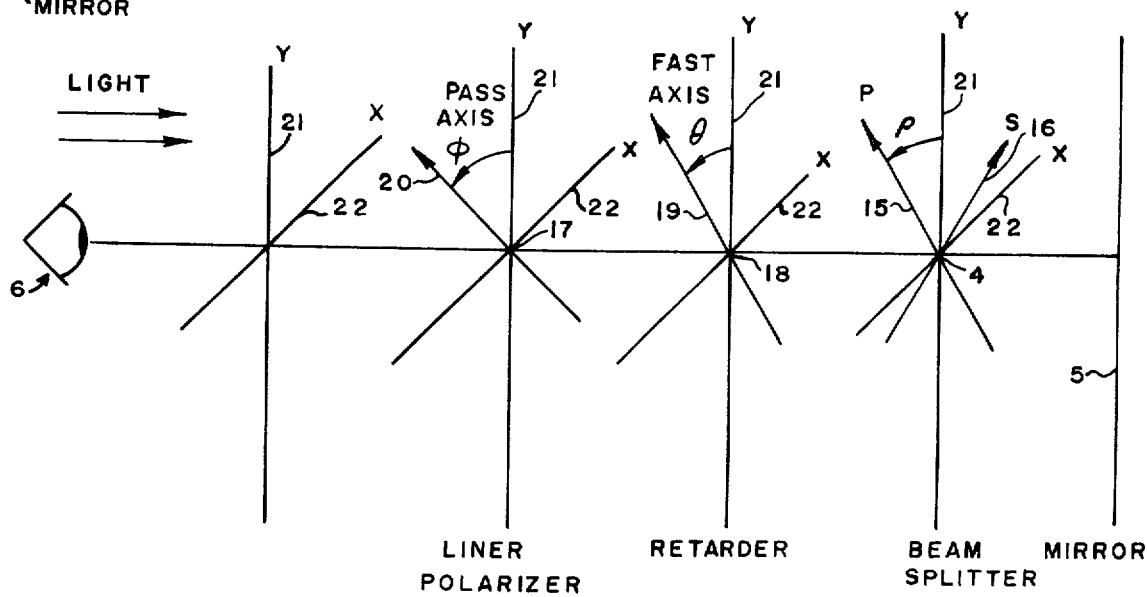
FIG. 3 is an expanded view useful for explanation purposes, demonstrating the optical device of this invention.

In the embodiment of my invention shown in FIG. 2, a linear polarizer 17 and a quarter wave retardation plate 18 are arranged with respect to one another and with respect to the beam splitter 4 so that the light beam 9 is prevented from returning to the side 10 of the system 1. The retarder 18 includes a fast axis 19 and a slow axis, not shown. The polarizer 17 has a pass axis 20 associated with it. The relationship of the polarizer, retarder, and beam splitter 4 may best be understood by reference to FIG. 3. As there shown, a reference vertical axis 21 and horizontal axis 22 correspond to true horizontal and vertical directions, although other reference directions may be utilized, if desired. The beam splitter 4 has its P axis 15 offset at a clockwise angle $\rho$ (rho) with respect to the vertical axis 21 as viewed from outside the system. The quarter wave retarder 18 has its fast axis 19 positioned at an angle $\theta$ (theta) with respect to the vertical axis 21, and the linear polarizer 17 has its pass axis 20 at an angle $\phi$ (phi) with respect to the vertical axis 21.

I have found that reflected light that has had its polarization altered due to the oblique passage of the light through a dielectric or other material and then returned through the same material may be eliminated by placing the fast axis 19 of the quarter wave retarder 18 at an angle parallel to either the P or the S axis of the material, the material in the embodiment illustrated being the beam splitter 4, and thereafter positioning the linear polarizer 17 so that it is oriented with its pass axis 20 in such a direction as to yield total extinction of the undesired reflection. That direction always exists and is governed by the formula, $\tan \phi = \pm |t_p| \div |t_s|$, where $\phi$ is the angle of the pass axis of the polarizer with respect to the P axis of the beam splitter 4, measured in a counterclockwise direction as viewed from the position of the mirror 5, or clockwise as viewed from the observer 6, where $t_p$ is the amplitude transmittance of the beam splitter 4 for light polarized in the P axis direction, and $t_s$ is the amplitude transmittance of the beam splitter 4 for the light polarized in the S axis direction, the | | signs indicating magnitude of the amplitude transmittance.

The same result can be obtained by a retardation plate and linear polarizer where their mutual orientation is fixed and the retardance of the retarder 18 varied to obtain extinction of light passing and returning through the beam splitter. In this instance, the fast axis 19 of the retarder 18 may be oriented, for example, at odd multiples of 45° to the pass axis 20 of the polarizer 17 and also at 45° to the P and S axes of the beam splitter 4. The retardance of the retarder 18 then can be varied to extinguish the undesired light beam 9. For the case when these angles are both 45°, the retardance in degrees is equal to twice the angel $\phi$ of the polarizer that was required to obtain extinction by the variation of the position of the linear polarizer. It should be noted that $t_p$ and $t_s$ refer to the amplitude transmittances of the components of a light beam, the components respectively being linearly polarized along the P and S axes of the beam splitter 4. $T_p$ and $T_s$, known in the art as intensity transmittance, are equal approximately to the square of the magnitudes of the amplitude transmittances $t_p$, $t_s$. Consequently, the above formula may be rewritten as, $\tan^2\phi = T_p/T_s$. The formula $\tan^2\phi = T_p/T_s$ assumes no absorption in the system 1. In addition, since $T_p = (1-R-A)$, where $R$ is the intensity reflectance of the beam splitter 4 and $(A)$ is an absorption factor, the equation can be rewritten as $$\tan^2\phi = \frac{1 - R_p - A}{1 - R_s - A}.$$

Hence, if $$\frac{1 - R_p - A}{1 - R_s - A}$$

is known, the retardance can be calculated. For example, assuming the absorption to be zero, one can take an unknown retarder between 0 and 1 wave length retardance, and tilt a beam splitter 4 in the system 1 described above to vary the ratio of $$\frac{1 - R_p}{1 - R_s}$$

until all returning light is extinguished. Then from the ratio $$\frac{1 - R_p}{1 - R_s}$$

required for light extinction, the retardance can be tabulated from the formula, retardance $= \sigma = 2\phi$, where $$\tan^2\phi = \frac{1 - R_p}{1 - R_s}.$$

The derivation of these formulas is later described in detail.

Partially polarized light generally may be described by four quantities known in the art as the Stokes parameters. These parameters are I, Q, U, and V, and are given by the following formulas:

$$I = \{a_x^2\} + \{a_y^2\} = \{a^2\}$$

$$Q = \{a_x^2\} - \{a_y^2\} = I (\cos 2\chi)(\cos 2\psi)$$

$$U = 2a_x a_y \cos(\theta_x - \theta_y) = I (\cos 2\chi)(\sin 2\psi)$$

$$V = 2a_x a_y \sin(\theta_x - \theta_y) = I \sin 2\chi,$$

where $a_x$ and $a_y$ are the components in the orthogonal direction $\hat{x}$ and $\hat{y}$, respectively, of the amplitude of the electric vector of the light wave. The { } brackets indicate a long time average, $a_i$ equals the amplitude in the $i$ direction, $\theta_i$ equals the phase angle of the $i^{th}$ component, and $\chi$, $a$, and $\psi$ describe the ellipticity of the polarized vector, shown in FIG. 9.

The equations for I, Q, U, and V can be represented by a sphere of radius I drawn in coordinates having axes Q, U, and V, which are mutually perpendicular. Any ellipticity will be represented by a point on the sphere, often called the Poincare' sphere. The intersection of the plane of the Q, U axes with the sphere is the great circle containing all linear polarization directions. Vertically polarized light is represented by the point on this circle at the negative Q axis; horizontal by the point on the positive Q axis as shown in FIG. 8. Traveling along the surface of the sphere in a plane parallel to the Q, U plane, one passed through all directions of polarized light of a constant ellipticity. Traveling in one of the great circles containing the intersection of the sphere with the plus and minus V axes, one passes all possible ellipticities of light polarized in a given direction. The plus V half of the sphere contains right-handed elliptical and circular polarizations; the minus V half contains left-handed polarizations. Circular polarizations are represented by the points where the V axis passes through the sphere. That is, the north and south poles, respectively, for right and left-hand circular polarizations. Polarizations which are diametrically opposed on the sphere are mutually orthogonal. A retarder is represented on the sphere by an axis passing through the center of the sphere and through the point on the sphere which would represent a linear polarization parallel to the fast axis of the retarder. The action of the retarder on any polarization is then represented by clockwise rotation about the aforementioned axis as viewed from outside the sphere, by an angle equal to the amount of retardance in degrees. Thus, a quarter wave retarder would have a retardance of $360°/4 = 90°$, and would be represented by rotation of 90°.

FIGS. 4, 5, 6, and 7 illustrate various solutions on the sphere for the formulas set forth above. That is, in FIG. 4, the fast axis 19 of the quarter wave retarder 18 is positioned at an angle $\theta = 0°$, which is parallel to the P axis 15 of the beam splitter 4, the beam splitter 4 also being positioned so that the angle $\rho$ is 0°. FIG. 5 represents the situation where the fast axis 19 of the quarter wave retarder 18 is positioned parallel to the S axis 16 of the beam splitter 4. In FIG. 6, the fast axis 19 of the retarder 18, and the pass axis 20 of the polarizer 17 are positioned at 45° to one another, and the retardance is varied to extinguish the unwanted light rays 9. In FIG. 7, the fast axis 19 of the retarder 18 is positioned at −45° from the pass axis 20 of the linear polarizer 17, and the retardance again varied to extinguish the unwanted light rays. The pass axis of the polarizer 17 is parallel to the S axis 16 of the beam splitter 4 in FIG. 6, and parallel to the P axis 15 in FIG. 7. In each of the above FIGS. 4–7, the effect of the passage through the retarder and the beam splitter is shown from an initial polarization state A. The position on the sphere indicated by the point B is the resultant light beam after passing through the retarder 18. The action of the beam splitter is effectively shown by moving from point B to point C. Passing back through the retarder moves the beam to the point D, which is the orthogonal, i.e. diametrically opposed linear polarization from the originally assumed polarization indicated at A. As described above, the effect of the beam splitter 4 is to enhance the vertical polarization component relative to the horizontal polarization component, and to decrease the radius of the sphere, assuming that the beam splitter is oriented so that the S axis direction is horizontal and the P direction is vertical. Thus, the initial polarization must be closer to horizontal the more the beam splitter tends to attenuate the horizontal component. Those skilled in the art will recognize the diagrams shown in FIGS. 3–7 are simplified for clarity since the effect of the mirror 5 is to change handedness and to reflect linear polarizations, and the effect of the beam splitter 4 equivalently has been shown as a single action after reflection by the mirror, for drawing simplicity. Nevertheless, in each case, the route on the surface of the Poincaré sphere ends at a point diametrically opposed to the starting point which represents an orthogonal polarization form and which will be cancelled by the polarizer that created the original polarization.

The derivation of formulas given above may be obtained from the representation of elliptically polarized light shown in FIG. 9, and the Poincaré sphere shown in FIG. 8. As previously described, the Stokes parameters describing the ellipticity of the polarized vector are:

$$Q = I(\cos 2\chi)(\cos 2\psi)$$

$$U = I(\cos 2\chi)(\sin 2\psi)$$

$$V = I \sin \chi$$

$$\psi = 90° - \phi$$

The ratio of the minor axis to the major axis of the ellipse is equal to $|\tan \chi|$.

When $\psi = 0$, $a_y/a_x = |\tan \chi|$.

When the P axis of the beam splitter 4 is aligned with the vertical reference axis $y$, $$a_y/a_x = a_p/a_s = |\tan \psi|.$$

In order to obtain orthogonal polarization of the radiation beam where the radiation beam passes through the beam splitter 4 twice, the major and minor axes of the ellipse must be interchanged, so $$a'_s = a_p$$

$$a'_p = a_s,$$

where prime notation indicates the second passage through the beam splitter.
But $$a'_s = t^2_s a_s$$

$$a'_p = t^2_p a_p.$$

Consequently,
$$a'_s = a_p = t^2_s a_s$$

$$a'_p = a_s = t^2_p a_p.$$

The linear polarization that will give the elliptical polarization after passage through a retarder occurs when $\psi = \chi$.

Therefore, $\dfrac{t^2_s}{t^2_p} = |\tan \chi|^2 = |\tan \psi|^2 = \dfrac{\sin^2\psi}{\cos^2\psi}$.

Since $\psi = 90° - \phi$ $$\dfrac{t^2_s}{t^2_p} = \dfrac{\sin^2(90 - \phi)}{\cos^2(90 - \phi)}$$

$\sin^2(90 - \phi) = \sin 90° \cos(-\phi) + \sin(-\phi) \cos 90°$ $\qquad = \cos(-\phi) = \cos \phi$ $\cos(90 - \phi) = \cos 90 \cos(-\phi) - \sin 90 \sin(-\phi)$ $\qquad = -\sin(-\phi) = \sin \phi.$ By substitution, $\dfrac{t^2_s}{t^2_p} = \dfrac{\cos^2\phi}{\sin^2\phi} = (\tan^2\phi)^{-1}$ $$\dfrac{t_p}{t_s} = \pm\tan\phi.$$

The mathematical derivations of the formulas given above also can be obtained by utilizing a system 1 matrix (S) illustrating the effect of the various elements of the system 1 on the light beam 9, which can be stated as follows:

$$(S)\begin{bmatrix}a_x\\a_y\end{bmatrix} = (P)(R)(B.S.)(B.S.)(R)(P)\begin{bmatrix}a_x\\a_y\end{bmatrix} = \begin{bmatrix}0\\0\end{bmatrix},$$

$$\text{where } (R) = \begin{bmatrix}\cos^2\theta + e^{-i\pi r}\sin^2\theta & \cos\theta\sin\theta - e^{-i\pi r}\sin\theta\cos\theta\\ \cos\theta\sin\theta - e^{-i\pi r}\cos\theta\sin\theta & \sin^2\theta + e^{-i\pi r}\cos^2\theta\end{bmatrix}$$

$$(B.S.) = \begin{bmatrix}t_p\sin^2\rho + t_s\cos^2\rho & -t_p\cos\rho\sin\rho + t_s\cos\rho\sin\rho\\ -t_p\cos\rho\sin\rho + t_s\cos\rho\sin\rho & t_p\cos^2\rho + t_s\sin^2\rho\end{bmatrix}$$

$$\text{and } (P) = \begin{bmatrix}\sin^2\phi & -\cos\phi\sin\phi\\ -\sin\phi\cos\phi & \cos^2\phi\end{bmatrix} = \begin{bmatrix}\sin^2\phi & -\tfrac{1}{2}\sin 2\phi\\ -\tfrac{1}{2}\sin 2\phi & \cos^2\phi\end{bmatrix},$$

r being the fractional retardance of the retarder

By substituting terms, concatenating the matrix, making the assumption that $\rho = \theta$, and choosing $\theta = 0$, one will obtain the formula $\tan \phi = \pm t_p/t_s$, which in turn may be converted to the form $$\tan^2\phi = \frac{1 - R_p}{1 - R_s}.$$

Knowing the relationship provided by $\tan^2\phi = t_p^2/t_s^2$, it is evident that the undesired light 9 from the light source 8 always can be elliptically polarized so that upon return to the polarizer after passage and return through the beam splitter 4 and retarder 18, the undesired light will have diametrically opposed linear polarization from the originally provided polarization and either will be totally absorbed or totally reflected at the polarizer 17. In either case, the undesired light will not appear on the side 10 of the system 1.

It will also be apparent to those skilled in the art that a very low cost method for determining an unknown quantity is provided with my invention. For example, the fast axis of a quarter wave retarder can be aligned with either of the P or S axes of an unknown material, and a light directed through the material toward a mirror placed on the opposite side of the material. A light directed through the polarizer, retarder, and material and reflected back therethrough will be extinguished as the polarizer pass axis is rotated with respect to the fast axis of the retarder. When the reflected light is extinguished, a direct angular measurement may be made between the pass axis of the polarizer and the fast axis of the retarder. The square of the tangent of the measured angle represents the ratio $$\frac{1 - R_p}{1 - R_s}$$

of the unknown material.

It is apparent from the foregoing that my invention meets all the ends and objects herein set forth.

Numerous variations, within the scope of the appended claims, will be apparent to those skilled in the art in light of the foregoing description and accompanying drawings. Thus, the apparatus may be utilized in applications other than that described. Any of the polarizer 17, beam splitter 4, mirror 5, and retarder 19 may be movably mounted in a particular application.

The retarder 19, illustratively described as a quarter wave retarder, may have other retardance values. Likewise, the beam splitter 4 is merely exemplary of partially polarizing materials. For example, birefringence introduced at the beam splitter position could be used in conjunction with the retarder to form a net retardance. The invention, in its broader aspects, is compatible with radiation other than visible light. Additional information regarding polarized light and Poincaré sphere operation, may be obtained, for example, in Schurcliff, W. A., and Ballard, S. S., *Polarized Light*, D. Van Nostrand Co., Inc., Princeton, New Jersey, 1964; and Born and Wolf, *Principles of Optics*, The MacMillan Co., New York, N.Y., 1959. These variations are merely illustrative.

Having thus described the invention, what is claimed and desired to be secured by Letters Patent is:

1. In a device including a material which partially polarizes radiation passing through it, said material having a P axis and an S axis, the improvement which comprises a retarder and a linear polarizer for imparting an elliptical polarization to radiation passing through the retarder and the linear polarizer, said retarder having a fast axis and a slow axis, said fast axis being aligned parallel to one of said P and S axes of said material, the retardance of the combination of said retarder and said material being approximately a quarter wave, said linear polarizer having a pass axis, said pass axis being placed at an angle $\phi$ with respect to the P axis of said material, where $\phi$ is determined from the formula $\tan^2\phi = |t_p^2/t_s^2|$, in which $t_p$ is the amplitude transmittance of the material for light polarized in the P direction, and $t_s$ is the amplitude transmittance of the material for light polarized in the S direction.

2. The improvement of claim 1 wherein the device comprises an optical system for a portion of an aircraft simulator, said simulator further including a mirror, said material comprising a beam splitter for said optical system, a cathode ray tube display adapted to be reflected by said beam splitter to said mirror for observation through said beam splitter in said aircraft simulator, said retarder and said linear polarizer comprising a window of said aircraft simulator.

3. The improvement of claim 2 wherein said fast axis of said retarder is aligned with the P axis of said beam splitter.

4. In a device having a material which partially polarizes radiation passing through it, said material having a P polarization axis and an S polarization axis, the improvement comprising means for preventing the observation of radiation passing through said material in two directions by elliptically polarizing the radiation upon its initial pass through the observation preventing means in the first direction so that the radiation returns to the observation preventing means in the second direction after passage through the partially polarizing material with the same ellipticity but with orthogonal orientation, said radiation observation preventing means including a retardation means having a fast axis, the retardance of the combination of said retarder and said partially polarizing material being a predetermined value, the fast axis of said retarder being arranged parallel to one of said P and said S axes directions, and a polarizer having a pass axis, said pass axis being positioned at an angle $\phi$ with respect to the P axis of said material, where $\phi$ is determined from the formula $\tan^2\phi = |t_p^2/t_s^2|$, $t_p$ being the amplitude transmittance of the material for light linearly polarized in the P axis direction and $t_s$ being the amplitude transmittance of the material for light linearly polarized in the S axis direction of the material.

5. The improvement of claim 4 wherein the fast axis of said retarder is parallel to the P axis of said material.

6. The improvement of claim 5 wherein the retardance of the combination of said retarder and said material is equal to 90°.

7. A method for determining the ratio of intensity transmittance for a partially polarizing material having a P axis and an S axis, comprising the steps:
 positioning said partially polarizing material before a mirror at a predetermined angle with respect to said material;
 positioning a retarder means before said material, said retarder means having a fast axis, said fast axis being aligned with one of said P and said S axes of said material;
 positioning a polarizer of light before said retarder means;
 directing a radiation beam through said polarizer, retarder, and material for reflection by said mirror and returning through said material retarder and polarizer;
 rotating said polarizer until the amount of reflected radiation passing through said polarizer is extinguished; and
 measuring the angle between the pass axis of said polarizer and the fast axis of said wave retarder.

8. The method of claim 7 wherein the angle between the fast axis of said retarder means is positioned parallelwise with one of the P and S axes of said material.

9. A method of extinguishing an electromagnetic radiation comprising the steps of:
 passing said electromagnetic radiation through an elliptically polarizing means, said elliptically polarizing means imparting an original desired elliptical polarization to said electromagnetic radiation, said polarizing means blocking electromagnetic radiation having an opposite polarization from said desired elliptical polarization;
 passing said electromagnetic radiation through a partially polarizing material in a first direction;
 reflecting said electromagnetic radiation back through said partially polarizing material in a second direction so that said radiation returns to said elliptically polarizing means with opposite polarization from said original desired elliptical polarization.

10. The method of claim 9 wherein said elliptical polarizing means comprises a linear polarizer having a pass axis, and a quarter wave retarder having a fast axis.

11. The method of claim 10 wherein the angle between the pass axis of said linear polarizer and the fast axis of said quarter wave retarder is adjusted to achieve extinction of said electromagnetic radiation.

12. The method of claim 10 wherein said partially polarizing material has a P axis and an S axis, the fast axis of said retarder being aligned with one of said P axis and said S axis of said partially polarizing material, the pass axis of said polarizer being positioned at an angle $\phi$ with respect to said P axis, $\phi$ being obtained from the formula, $\tan^2\phi = |t_p^2/t_s^2|$, where $t_p$ is the amplitude transmittance of the partially polarizing material in the P axis direction and $t_s$ is the amplitude transmittance of the partially polarizing material in the S axis direction.

13. The method of claim 9 wherein said partially polarizing material has a P axis and an S axis, said elliptically polarizing means includes a linear polarizer having a pass axis, and a retarder having a fast axis, the pass axis of said polarizer being aligned with one of said P and S axes, the fast axis of said retarder being oriented at an odd multiple of 45° with respect to the pass axis of said polarizer, including the further step of varying the retardance of said retarder until the radiation returning to said polarizer has the opposite polarization from said original desired elliptical polarization.

14. The method of claim 9 wherein said partially polarizing material has a P axis and an S axis, said elliptical polarizing means includes a linear polarizer, said linear polarizer having a pass axis, and a retarder, said retarder having a fast axis, the fast axis of said retarder being oriented at 45° with respect to the pass axis of said polarizer, including the further step of varying the position of said partially polarizing material until the radiation returning to said polarizer has the opposite polarization from said original desired elliptical polarization.

15. A device for eliminating reflections of undesired electromagnetic radiations from a system, comprising:
 reflecting means;
 partially polarizing means, said partially polarizing means being aligned with said reflecting means, said partially polarizing means having property wherein a greater amount of a first linearly polarized component of electromagnetic radiation incident upon it is transmitted as compared to a second linearly polarized component of electromagnetic radiation incident upon it, said partially polarizing means maintaining the relative phase relation of said first and said second polarized components; and
 elliptically polarizing means disposed on a side of said partially polarizing means opposite said reflecting means, said polarizing means being arranged so that all undesired electromagnetic radiation passes through it, said polarizing means further having a property enabling it to block electromagnetic radiation having an opposite polarization from that originally imparted by said polarizing means, said polarizing means being adapted and arranged to impart an original polarization to said undesired electromagnetic radiation such that an opposite polarization is present at said polarizing means after passage through said partially polarizing means, reflection from said reflecting means, and passage again through said partially polarizing means.

* * * * *